(12) United States Patent
Chambers et al.

(10) Patent No.: US 7,512,398 B2
(45) Date of Patent: Mar. 31, 2009

(54) AUTHENTICATING DATA UNITS OF A MOBILE COMMUNICATIONS DEVICE

(75) Inventors: Michael J. Chambers, Erlangen (DE); Michael Kiessling, Freising (DE); Kenneth A. Tuchman, Munich (DE)

(73) Assignee: Agere Systems Inc., Allentown, PA (US)

( * ) Notice: Subject to any disclaimer, the term of this patent is extended or adjusted under 35 U.S.C. 154(b) by 485 days.

(21) Appl. No.: 11/209,583

(22) Filed: Aug. 23, 2005

(65) Prior Publication Data

US 2007/0049250 A1    Mar. 1, 2007

(51) Int. Cl.
*H04M 1/66* (2006.01)
*H04M 1/68* (2006.01)
*H04M 3/16* (2006.01)

(52) U.S. Cl. .................... 455/411; 455/410; 455/414.1; 379/127.02; 379/142.05

(58) Field of Classification Search ................ 455/410, 455/411, 414.1; 379/127.02, 142.05
See application file for complete search history.

(56) References Cited

U.S. PATENT DOCUMENTS

| 5,848,301 | A | * | 12/1998 | Nonaka | ........................ 396/56 |
| 6,433,818 | B1 | * | 8/2002 | Steinberg et al. | ............. 348/161 |
| 6,603,876 | B1 | * | 8/2003 | Matsuo et al. | .............. 382/154 |
| 6,880,750 | B2 | * | 4/2005 | Pentel | ......................... 235/380 |
| 2001/0051509 | A1 | | 12/2001 | Mukai et al. | |
| 2003/0135740 | A1 | * | 7/2003 | Talmor et al. | ................ 713/186 |
| 2004/0125208 | A1 | * | 7/2004 | Malone et al. | ........... 348/207.1 |
| 2005/0182302 | A1 | * | 8/2005 | Johnson et al. | .............. 600/300 |
| 2005/0255840 | A1 | * | 11/2005 | Markham | ................. 455/422.1 |

FOREIGN PATENT DOCUMENTS

EP    1298913 A2    4/2003

OTHER PUBLICATIONS

Bernd Rieger and Harry Rode; "Digital Image Recording for Court Related Purposes";(XP 010355733) 1999 IEEE; pp. 262-279.
Paul Blythe and Jessica Fridrich; "Secure Digital Camera"; XP-002413047; Retrieved from the Internet: URL:http://www.ws.binghamton.edu/fridrich/Research/DFRWSfinal.pdf; 12 Pages, no date provided.
European Patent Office Search Report dated Jan. 16, 2007 for related case filed in EP Application No. 06254403.6.
Paul A. Blythe Sr.; "Biometric Authentication System for Secure Digital Cameras"; Submitted in partial fulfillment of the requirements for the degree of Doctor of Philosophy in Systems Science in the Graduate School of Binghamton University of New York; Retrieved from Internet: URL:http://dde.binghamton/edu/blythe/SDC.pdf; 88 Pages (XP002413048), no date provided.
European Patent Office Search Report dated Jan. 16, 2007 for related case filed in EP Application No. 06254403.6.

* cited by examiner

*Primary Examiner*—Stephen M D'Agosta

(57) ABSTRACT

The present invention provides a method for authenticating a digital data unit of a mobile communications device. In one embodiment, the invention provides for the capture of a digital data unit with a mobile communications device and generating authentication data to confirm at least one of the source or integrity of the digital data unit.

32 Claims, 5 Drawing Sheets

Fig. 1a
Fig. 1b
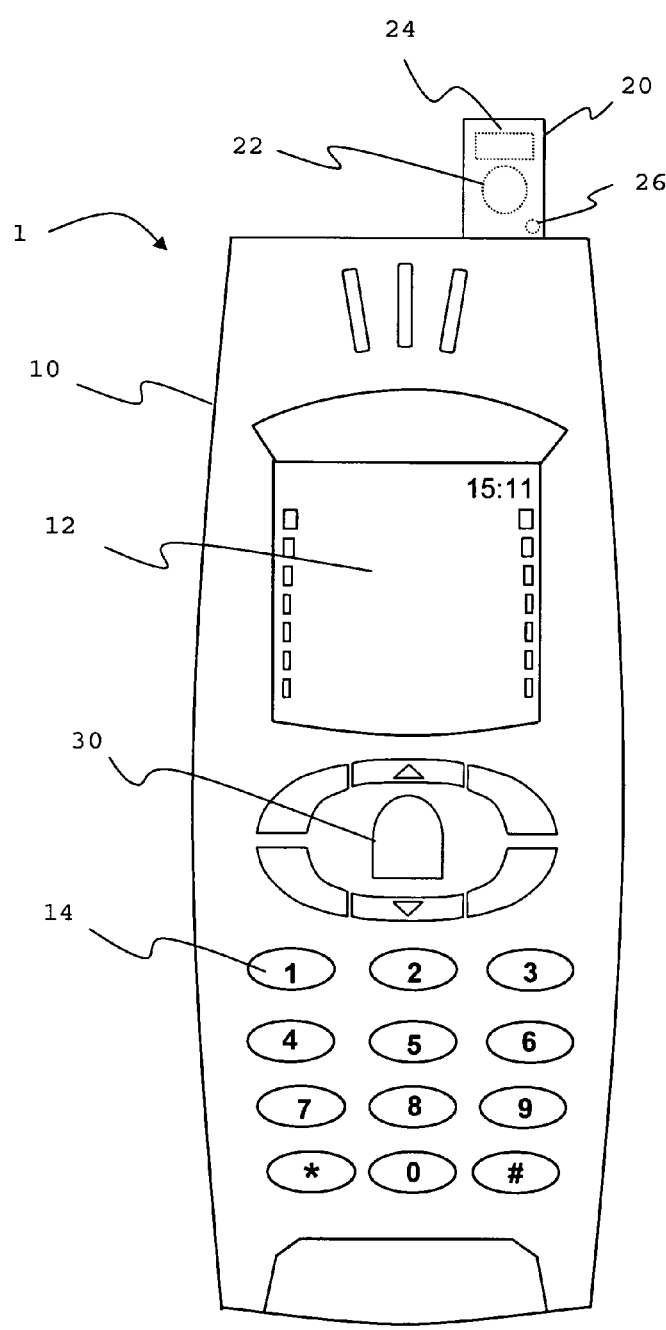
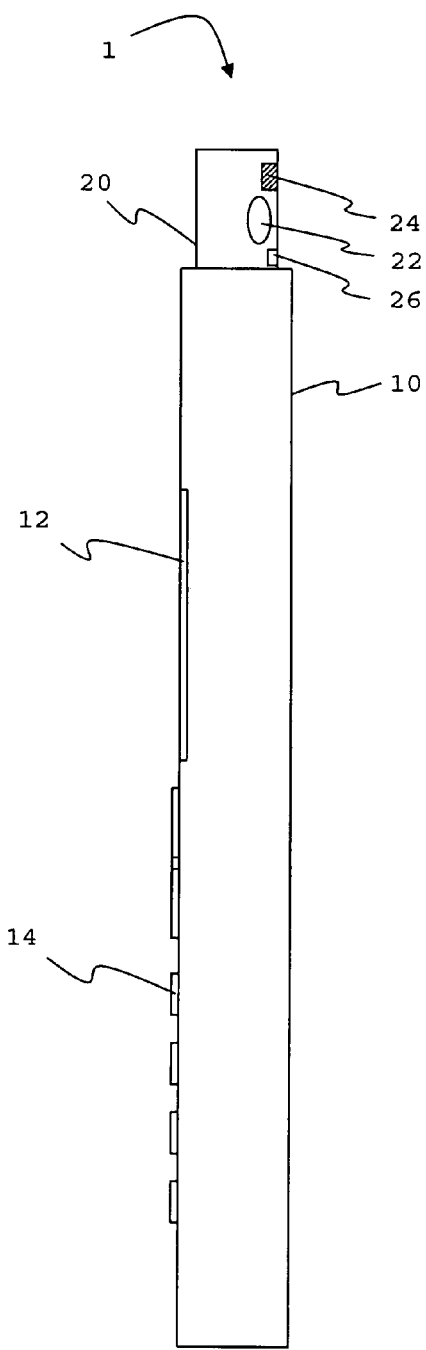

AUTHENTICATING DATA UNITS OF A MOBILE COMMUNICATIONS DEVICE

TECHNICAL FIELD OF THE INVENTION

The present invention is directed, in general, to mobile communications devices and, more specifically, to a method and device for authenticating a mobile communications device's digital data unit.

BACKGROUND OF THE INVENTION

Digital photography and other digital media have replaced a major segment of traditional analog media. This raises the question of how to authenticate or verify that the digitally taken photograph or other digital media has not been tampered with or altered. Digital data can be easily duplicated or altered utilizing computers and other digital devices. So many software applications are available for video or audio processing that for even a relatively unskilled person can easily alter digitally captured data. Thus, persons relying on a digital photograph or other digital data for factual accuracy may want proof that the digital data being relied is the genuine article.

For many commercial purposes the owner of a digital image or audio file has an interest in being able to ascertain whether the image or file has been copied or altered. For example, a television or radio station would generally want to be in a position to prove the genuineness of a data file if the content or accuracy of such file is challenged. An entertainer who has a digital recording of a performance made with a handheld communications device has an interest in assuring that the recording is not copied or distributed. In U.S. Pat. No. 6,628,801, entitled IMAGE MODIFICATION WITH PIXEL MODIFICATION, to Robert D. Powell, et al. (Powell), a method and system is described for inseparably embedding signatures within a visual image so that it persists throughout any image transformation.

In certain areas of interest, such as digital data used as evidence in a legal proceeding, a system or method for the authentication of captured digital data is needed. Powell does not provide this level of authentication. It is also desirable that a useful level of authentication for digital data be available for use with a mobile communications device. This would be particularly useful because mobile communications devices, such as mobile phones and personal digital assistants, are a constant companion for a large percentage of the population.

Mobile phones, as well as other mobile communications devices, have become multi-functional. In addition to being used for speech communications, mobile phones are being equipped with applications that provide SMS or MMS based messaging, e-mail and fax services. They are also routinely equipped with a recording apparatus for capturing dialog or to take speech notes as well as a digital camera for taking still photos and moving pictures in short video clips. However, thus far no method or device is known to authenticate digital data captured by a mobile communications device.

Accordingly, what is needed in the art is a new method and device to authenticate digital data, particular digital data captured by means of a mobile communications device such as a mobile phone.

SUMMARY OF THE INVENTION

To address the above-discussed deficiencies, the present invention provides a method for authenticating a digital data unit of a mobile communications device. In one embodiment the invention provides for the capture of a digital data unit with a mobile communications device and generating authentication data to confirm at least one of the source or integrity of the digital data unit.

The present invention provides for a number of embodiments to authenticate a visual, audio, or visual and audio digital data unit captured by a mobile communications device. Each such embodiment serves to authenticate that the particular data unit has not been tampered with and that the data unit is that as originally captured by the mobile communications device. Thus, an authenticated data unit can be reliably used in situations where it is critical that the data be original, such as would be the case for an insurance claim, a court proceeding, or other similar situations.

An embodiment of the method calls for the provision of reference data that corresponds to the digital data unit, where the reference data is selected from a group of various kinds of reference data consisting of (i) data representing the date and time the digital data was captured; (ii) data representing the location the digital data unit was captured; (iii) data identifying the owner of the mobile communications device; (iv) data identifying the person who captured the digital data unit; (v) data identifying the mobile communications device; (vi) data identifying a network operator of a mobile communications network to which the mobile communications device is connectable; and (vii) data representing the position or distance of an object within a visually captured scene relative to the mobile communications device or relative to another object within the visually captured scene. In one embodiment the digital data unit at least partly comprises the reference data.

Other embodiments of the invention provide for the generation of a unique identifier with respect to a digital data unit or with respect to the reference data, or both, by means of a pre-defined algorithm. Another embodiment provides that the generating of authentication data further includes generating a hash value resulting from a hash function executed on the digital data unit. One embodiment provides for generating the authentication data to include cryptographically transforming or digitally signing the digital data unit by means of a cryptographic algorithm. As aspect of this embodiment provides for digitally signing by generating a digital signature from the digital data unit by means of an asymmetric cryptographic algorithm using a private key of an asymmetric key pair. In one embodiment of the invention, generating authentication data includes generating a digital signature from the hash value by means of an asymmetric cryptographic algorithm using a private key of an asymmetric key pair. Of course, an HMAC algorithm may also be used.

A useful embodiment of the invention provides for the reference data to include data representing the date and time the digital data unit was captured with such date and time being based on a time base provided by a network operator or time stamp provided by a service provider. In one embodiment the time base is NITZ (Network Identity and Timezone) according to 3GPP TS 22.042 V6.0.0.

An aspect of the invention provides for the mobile communications device to be connectable to a cell-based mobile communications network so that the reference data will include information about neighboring cells at the time the digital data unit was captured. Another aspect provides for the mobile communications device to be associated with a GPS receiver and for the reference data to include information regarding the geographical location of the mobile communications device at the time the digital data unit was captured. GPS could also be used to provide a time stamp as part of the reference data.

In another embodiment of the invention the mobile communications device has an associated SIM card and the reference data includes data from the SIM card that unequivocally identifies the owner of the mobile communications device and/or the network provider to which the mobile communications device is connectable. In yet still another embodiment, the invention provides for the capture of fingerprint data of the person operating the mobile communications device when the digital data unit was captured, which fingerprint data is included in the reference data. In still another embodiment, the invention provides for the capture from different viewpoints of at least two images of a visually captured scene and determining the position or distance of at least one object within the scene relative to the mobile communications device or relative to another object within the scene, which information is included in the reference data.

Another embodiment provides for the reference data to include a certificate that unequivocally identifies the mobile communications device. In yet another embodiment, data is transmitted to a database server, which transmitted data is selected from the group consisting of: a digital data unit; reference data; a unique identifier generated on the basis of the digital data unit and/or the reference data; a hash value generated by executing a hash function on the digital data unit; and a digital signature generated from the digital data unit by means of an asymmetric cryptographic algorithm using a private key of an asymmetric key pair. In still another embodiment, the invention provides for authenticating the digital data unit by means of the authentication data.

The present invention also provides for a mobile communications device that, in one embodiment, comprises (1) a means for capturing a digital data unit; and (2) a means for generating authentication data to confirm at least one of the source or integrity of the digital data unit. An aspect of this embodiment provides for a means for providing reference data corresponding to the digital data unit, the reference data selected from the group consisting of: (i) data representing a date and time the digital data unit was captured; (ii) data representing a location the digital data unit was captured; (iii) data identifying an owner of the mobile communications device; (iv) data identifying the person who captured the digital data unit; (v) data identifying the mobile communications device; (vi) data identifying a network operator of a mobile communications network to which the mobile communications device is connectable; and (vii) data representing the position or distance of an object within a visually captured scene relative to the mobile communications device or relative to another object within the visually captured scene.

The invention also provides for several other embodiments of a device to implement the previously described methods. These devices will be readily understood by a person skilled in the pertinent art from the methods described herein.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which:

FIGS. 1a and 1b illustrate planar frontal and planar side views of a mobile communications device constructed in accordance with the present invention;

DETAILED DESCRIPTION

Figure 2:
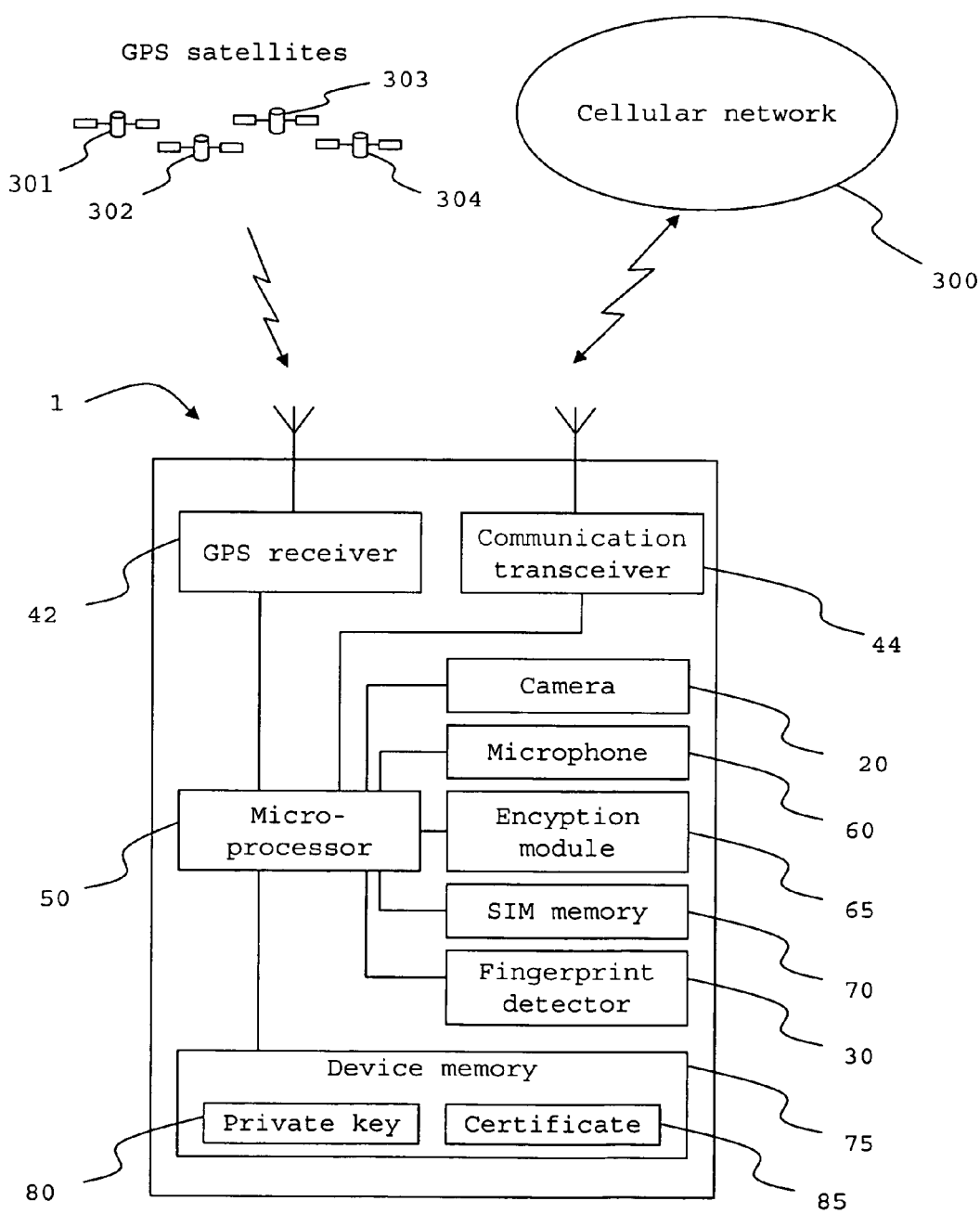
FIG. 2 illustrates a block diagram of a mobile communications device constructed in accordance with the present invention.

Before describing the FIGURES, various aspects, embodiments and features of the present invention will be described. The invention presents a method and a device for capturing digital visual, audio or visual and audio data with a mobile communications device and authenticating the captured data. For the purpose of this application, a digital data unit is the digital visual and/or audio data that comprises or makes up a digital image, a digital video sequence, a digital audio sequence or any combination thereof. Thus, an image or images, an audio recording, a video or video clip, or any combination of the forgoing can make up a digital data unit. Thus, one embodiment of the invention provides for using a mobile communications device to capture a digital data unit and generating authentication data to confirm the source or integrity of such digital data unit. The present invention thereby enables a user of a mobile communications device to capture digital visual, audio, or audio-visual data and to prove the authenticity of the captured data at a later time. The generation of the authentication data can be performed within the mobile communications device itself or by a separate device.

Additional information is typically needed to provide authentication for digital data. Therefore, the present invention provides for reference data to be secured for authentication, which reference data will correspond to and authenticate the captured visual and/or audio digital data unit. A wide variety of different types or kinds of reference data can be utilized for authentication. Although several of these different kinds of reference data are described herein, the invention is not limited to these and is intended to also encompass any other type of reference data that may be suitable, whether now known or subsequently discovered.

Particularly useful reference data will include data regarding the date and time visual and/or audio data was captured. Preferably this will be based on the manipulation of a secure time base, which in one embodiment is provided by a network operator. A particularly suitable time base is NITZ (Network Identity and Timezone) according to 3GPP TS 22.042 V6.0.0.

A NITZ message can be used to transfer network identity and time information from a network operator to a mobile communications device, which information will usually be in the format of universal time (UT) consisting of year, month, day, hour, minute, second, time zone and DST (Daylight Savings Time).

Reference data can also include data representing the location where visual and/or audio data is captured. In one embodiment of the invention, location is determined by the mobile communications device connecting to a cellular network to secure information about neighboring cells at the time of capture of visual and/or audio data. This information can be accurately reproduced at a later time and used to verify the location of data capture.

Another embodiment, providing an even more precise location of data capture, calls for a GPS receiver to be associated with the mobile communications device. Based on GPS data received at the time of visual and/or audio data capture, precise reference data is collected regarding the geographical location of such capture as well as the time of such capture.

Mobile communications devices such as mobile phones are typically provided with SIM (Subscriber Identity Module) cards that contain network provider and subscriber information. In one embodiment of the invention, the reference data includes data from the SIM card to unequivocally identify the subscriber or owner of the mobile communications device and/or the network provider for the mobile communications network to which the mobile communications device is connected.

Because a mobile communications device can be used by a person other than its owner, one embodiment of the present invention provides for the capture of data regarding the actual user of the device at the time of capture of the visual and/or audio data. Particularly suitable for this purpose is the capture of biometric data regarding the user. Thus, an embodiment of the invention provides for the mobile communications device to be provided with a means for capturing biometric data of the user. One such means, but not the only one, would be a fingerprint detector to capture fingerprint data of the person operating the mobile communications device at the time the visual and/or audio data is captured.

When visual data is captured, one embodiment of the invention provides for the capture of at least two images of the scene from different viewpoints. An advantage of this embodiment is that information about the position or distance of at least one object within the scene relative to the mobile communications device or relative to another object within the scene can be determined. These two images can be captured consecutively with a single camera or simultaneously if two cameras are used. In one embodiment the mobile communications device is provided with two cameras for this purpose.

The reference data can also include a certificate to unequivocally identify the mobile communications device. The certificate will preferably be "owned" by the mobile communications device; that is, it will be stored within the device and identify the individual device in which it is stored. The validity of the certificate may be on a subscription basis with the certificate being valid for a specific time. A subscription could be offered, for example, by a network operator or by the manufacturer of the device. Such a subscription could provide for a certificate that is valid for the lifetime of the device based on the device's serial number and could be hard-coded into the device circuitry.

In one embodiment the method of providing authentication data provides for the generation of a unique identifier. Such unique identifier can be generated with a pre-defined algorithm where the input parameters of the algorithm depend on captured data and/or the corresponding reference data. For example, a digital image taken with a camera module of a mobile communications device can be combined with corresponding reference data, such as network operator information and system time, to generate a unique identifier that can be used to digitally sign the image. It is desirable that the pre-defined algorithm provide a unique identifier that differs from any other unique identifier generated on the basis of different captured data or reference data. In order to prevent tampering with the pre-defined algorithm, in one embodiment it is securely stored in the mobile communications device. When the algorithm is known to a trusted entity, the authenticity of the captured data and any reference data used to generate the unique identifier can be verified by such trusted entity; which trusted entity may be, for example, a network operator or the device manufacturer.

A suitable algorithm would be a hash function that generates a hash value when executed on a digital data unit, which digital data unit comprises captured visual and/or audio data optionally appended by any of the above described reference data. A hash value delivered by a hash function typically has a fixed data length, independent of the length of the input data. Furthermore, the hash function used is preferably one-way such that it is difficult to invert the hash function. That is, a one-way hash function H means that given a hash value h, it is computationally infeasible to find some input x such that $H(x)=h$. Preferably the hash function also is collision-free so that it is computationally infeasible to find an input y not equal to input x such that $H(x)=H(y)$, and in particular it is computationally infeasible to find any two inputs x and y such that $H(x)=H(y)$. A hash value concisely represents the digital data unit on which the hash function is executed. Any known hash function can be used for the inventive method such as: the message digest algorithms MD2, MD4 or MD5; the secure hash algorithm SHA; the RACE integrity primitives evaluation message digest RIPEMD-160; or the so-called Tiger or Whirlpool algorithms.

Generating authentication data includes cryptographically transforming or digitally signing the digital data unit by means of a cryptographic algorithm. Digitally signing means generating a digital signature from the digital data unit by way of an asymmetric cryptographic algorithm using a private key of an asymmetric key pair. The advantage of utilizing an asymmetric cryptographic algorithm is that only the public key of the asymmetric key pair is needed for verification. The cryptographic algorithm used to generate the digital signature is preferably such that, without knowing the private key, it is not feasible to create a digital signature that would be considered valid when verified by means of the public key.

Generating authentication data includes generating a digital signature from a hash value, which hash value is generated as herein described, with an asymmetric cryptographic algorithm using a private key of an asymmetric key pair. Digitally signing the hash value of the digital data unit is faster than digitally signing the digital data unit itself, since execution of a hash function is typically faster than performing the cryptographic algorithm for generating a digital signature based on a private key. The digital signature generated by a corresponding cryptographic algorithm is typically similar in size to the data unit to be signed. Accordingly, because the hash value has a defined data length independent of the length of the data unit on which the hash function is executed, digitally signing the hash value yields a much shorter digital signature than digitally signing the digital data unit that makes up the captured data in its entirety. Cryptographic algorithms suitable for generating digital signatures include, but are not limited to, the RSA (Rivest/Shamir/Adleman) algorithm and the digital signature algorithm DSA based on the ElGamal method.

For later cross-reference to or authentication of captured data the present invention also includes transmitting the data to a database server. The data transmitted can be the digital data unit made up of the captured visual and/or audio data and any corresponding reference data. A unique identifier generated on the basis of the digital data unit and/or the reference data, a hash value generated by executing a hash function on the digital data unit, or a digital signature generated from the digital data unit by way of an asymmetric cryptographic algorithm using a private key of an asymmetric key pair can all be transferred to a server for long-time storage. A data transfer from a mobile communications device to a database server can be performed via the mobile communications network to which the device is connectable or, in the alternative, the data can first be transferred from the mobile communications device to a user's computer and then to the database server via the Internet.

Another method for generating authentication data is to transfer the digital data captured by the mobile communications device to a database server of a trusted entity and combine the captured data on the server with corresponding reference data provided by the trusted entity. The reference data can, for example, include information about the subscriber from whom the captured was transferred and the date and time the data was received by the server. To prevent possible tampering with captured digital data when the data is not encrypted, the captured data can be automatically transmitted to a database server without the user ever having access to the captured data.

In most cases, encryption provides for a significantly higher security level for captured data. To provide this higher level of security, the verification process can differ slightly from the previously described variations. When a unique identifier is generated by means of a pre-defined algorithm on the basis of the captured data and some form of reference data, such as the capture time, for verification purposes the authenticity of the captured data and the reference data is proven when the same unique identifier is generated when the algorithm is executed again by a trusted entity to whom the algorithm is known. When utilizing a digital signature on the basis of an asymmetric cryptographic algorithm, using a private key of an asymmetric key pair and the digital signature and public key are provided for verification purposes, if the digital data unit that results from performing the known cryptographic algorithm on the digital signature using the public key is a match with the provided digital data unit, the authenticity of the provided digital data unit is proven. When digitally signing the hash value of a digital data unit for verification purposes, the digital data unit, the digital signature of the hash value and the public key are provided. If the hash value resulting from executing the known hash function on the provided digital data unit matches with the hash value resulting from performing the known cryptographic algorithm on the digital signature using the public key, then the authenticity of the provided digital data unit is proven.

The asymmetric key pair can correspond with a person, such as the owner of the mobile communications device, or with the mobile communications device itself. To verify that the provided public key actually corresponds to the claimed person or device, a certificate can be provided that, at a minimum, includes the public key together with information about the person or device to which it belongs. Such a certificate can be issued by a trusted entity that serves as a certifying authority (CA), such as, for example, the network operator to which the owner subscribes to or the manufacturer of the mobile communications device. Typically, in public key infrastructures (PKI) a certificate will include a digital signature of the certificate issuer.

In one embodiment of the invention, a mobile communications device will include a capturing means for capturing visual and/or audio data, a means for providing at least one digital data unit that comprises visual and/or audio data captured with said capturing means, and a generating means for generating authentication data that allows a recipient of the digital data unit to confirm the source and/or integrity of the digital data unit. The invention described herein can be used for mobile phones or smart phones as well as for PDA or MDA style devices or any other type of mobile communications device, whether now known or subsequently discovered or developed.

The capturing means may include one or more of a camera module adapted to capture digital images; or, a camera module adapted to capture digital video sequences; or, an audio recording module comprising a microphone adapted to capture digital audio sequences. The mobile communications device will further include a means for providing reference data corresponding to the visual and/or audio data captured by the capturing means. This reference data can be one or more of any of the different types of reference data described above as well as any other data that can be used to correspond in any way with the captured data.

To prove the authenticity of the captured data, several different kinds of reference information or conditions may need to be known and captured. Such kinds of reference data can include information regarding one or more of the following types: where the data was captured; when the data was captured; who captured the data; the authenticity of the device with which the data was captured; or the authenticity of the captured data. Thus, the invention provides for a mobile communications device that preferably includes a means to provide such reference information. Thus, the mobile communications device will include a means for providing the current date and time. To provide the current date and time, a manipulation secure time base provided by the network operator on the basis of NITZ (Network Identity and Timezone) according to 3GPP TS 22.042 V6.0.0 can be used with the mobile communications device being adapted to receive and utilize NITZ messages sent by a network provider.

For providing location information the present invention includes an embodiment that provides a means for determining cell information regarding the cellular network to which it is connectable. Even more precise location information can be provided when the device also includes a GPS receiver for determining the geographical position of the device when data is captured and/or time such data is captured.

Another embodiment provides for information identifying the owner of the device and/or identifying the network operator, which information can be retrieved from a SIM card integrated into the mobile communications device. To provide information on the identity of a user of a mobile communications device who may not be the owner, as identified on the SIM card, one embodiment the invention includes a means for capturing biometric data of the user. One way such biometric data can be captured is to require the user to provide a fingerprint and to equip the device with a fingerprint detector to collect the fingerprint. In one embodiment a fingerprint detector is integrated into the shutter release of the camera module to automatically capture a fingerprint when the camera module is activated.

In another embodiment of the invention, the capturing means of the mobile communications device includes two camera modules arranged to capture digital images from different viewpoints. This information enables a determination regarding the spatial relationship between visually captured objects.

To generate data for the authentication of the captured data, one embodiment of the invention provides for a means for generating a unique identifier from a digital data unit and/or the corresponding reference data by using a pre-defined algorithm stored in a memory of the device. Preferably the user will not have access to the device memory so that tampering or the possibility of tampering is prevented. In many cases mobile communications devices are equipped to protect against such manipulation because such protection is required by ETSI standards in order to provide a secure platform.

To assure a standard of high security, one embodiment of the invention provides for the mobile communications device to have an encryption module adapted to cryptographically transform a digital data unit capable of generating a hash value by using an asymmetric cryptographic algorithm as described above. Because captured data is usually linked to the mobile communications device rather than to a person, the device can also be provided with a digital certificate to unequivocally identify the device, which certificate can be issued by the manufacturer of the device, the details of which are described above.

Referring to the foregoing discussion regarding the information or conditions needed for proving authenticity, the data regarding such authenticity can be provided by a GSM/GPRS typical neighbor cell report or by GPS data in order to authenticate a location where data is captured and/or time such data is captured. The location where data is captured can also be authenticated by using a manipulation secure time base such as, for example, the NITZ or World Clock feature used by networks to provide mobile phones with accurate time data. The party capturing data can be validated by deriving parameters from SIM card of the device capturing the data or by employing biometrics to identify the user. Authenticity of the device can be ensured by utilizing an individual device owned certificate. The basic requirement of authenticating captured data can be achieved by the mobile communications device itself where the data to be authenticated is combined with a device certificate as well as other protective methods discussed herein.

For long-time storage and later reference, authentication of captured data can be transmitted to a database server. One embodiment of the invention provides for a communications system to include: (1) a mobile communications device, as described herein; (2) a database server for receiving and storing a digital data unit of visual and/or audio data captured by the mobile communications device, to which is optionally appended (a) reference data, (b) a unique identifier generated on the basis of the digital data unit and/or the reference data, (c) a hash value generated by executing a hash function on the digital data unit, and (e) a digital signature generated from the digital data unit by means of an asymmetric cryptographic algorithm using a private key of an asymmetric key pair: and (3) a communications network, to which the mobile communications device and the database server are connectable. The communications network preferably supports at least GSM (Global System for Mobile Communications) and/or UMTS (Universal Mobile Telecommunications System) protocols, however, the invention is not limited to GSM or UMTS, but also includes any other communications network and appropriate devices, whether now known or subsequently discovered.

To provide an easy implementation and/or specific adaptation of the present invention, a digital storage medium is proposed, such as a microchip, that includes electronically readable control instructions adapted to execute any of the embodiments of the above described invention when it is inserted in a mobile communications device. Accordingly, the present invention proposes a digital storage medium, made up of electronically readable control instructions for controlling a communications device adapted to execute a process, including the steps of (1) capturing visual and/or audio data with a capturing means of the mobile communications device; (2) providing at least one digital data unit, comprising the captured visual and/or audio data; and (3) generating authentication data which allows definitive proof of the source and/or integrity of the data unit. The process also includes the provision of reference data corresponding to the visual and/or audio data. The control instructions include at least one cryptographic algorithm that is adapted to generate a digital signature.

Referring to FIGS. 1a and 1b, illustrated are planar frontal and planar side views of a mobile communications device 1 constructed in accordance with the present invention. The illustrated mobile communications device 1 is a mobile phone with a main body 10 formed for use with one hand. The illustrated mobile phone has a user interface that includes a keypad 14 and a display 12. To capture digital images the mobile communications device 1 is provided with an appropriately adapted camera module 20. The illustrated camera module 20 has a lens 22, a flash attachment 24 and a self-timer connected to an LED 26 that indicates the elapse of time for the self-timer. As illustrated in FIG. 1b, the camera module faces to the back side of the mobile phone mobile communications device 1 to permit an image to be captured on the display 12 to be previewed. For the purpose of identifying a user biometrically, the mobile communications device 1 is provided with a fingerprint detector 30. The fingerprint detector 30 is advantageously incorporated into the key or button used as a shutter release for the integrated camera module 20.

Turning now to FIG. 2, illustrated is a block diagram of a mobile communications device 1 constructed in accordance with the present invention. For data communication purposes the mobile communications device 1 is provided with a communications transceiver 44. The illustrated embodiment also has a GPS receiver 42. The communications transceiver 44 is adapted to communicate with a cellular network 300 and the GPS receiver 42 is adapted to determine the geographical position of the mobile communications device 1 by receiving data from four GPS satellites 301, 302, 303 and 304 and the time.

The mobile communications device 1 is controlled by a microprocessor 50, which executes operating software stored in a device memory 75. The software is adapted to execute a process for the capture of visual and/or audio data. To capture a digital data image the mobile communications device 1 has a camera module 20. The mobile communications device 1 also has a microphone 60 that will provide at least one digital audio sequence.

Figure 3A:
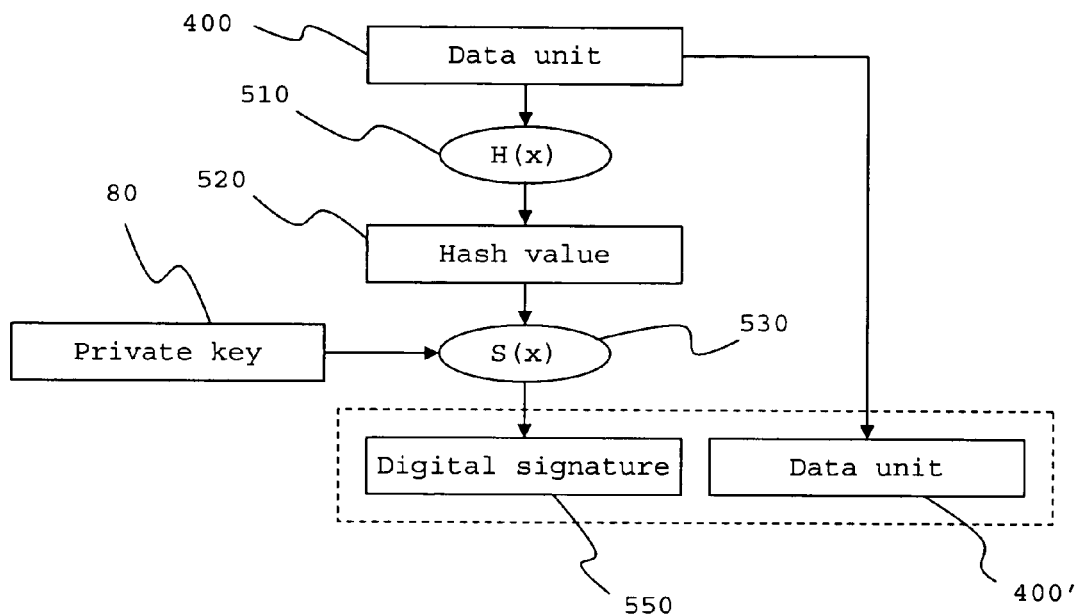
FIGS. 3a and 3b illustrate flow charts for generating authentication data of a digital signature and proving the authenticity of such signature.
Figure 3B:
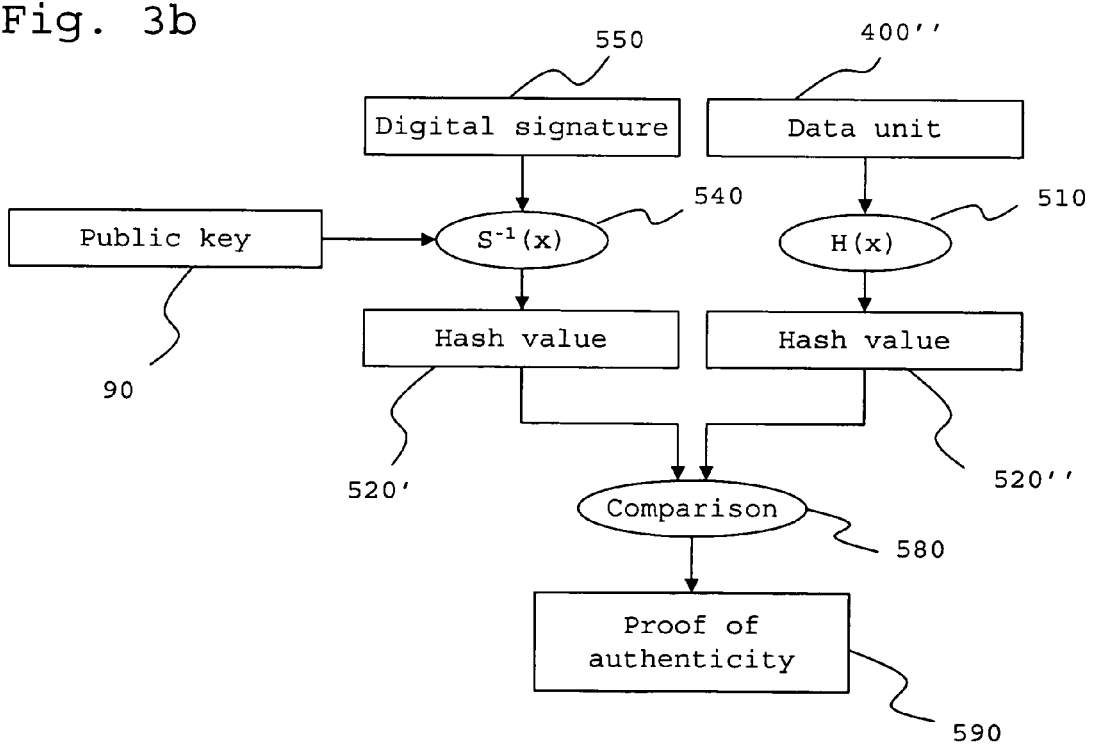

FIGS. 3a and 3b illustrate flow charts for generating authentication data of a digital signature and proving the authenticity of such signature. The mobile communications device 1 processes the reference data to correspond with the captured visual and/or audio data. In one embodiment of the invention, the reference data includes information about the geographical location of the device 1 at the time the visual and/or audio data was captured, which location is derived from GPS data from the GPS receiver 42. The reference data can also consist of data identifying the owner of the mobile communications device 1 from SIM memory 70. To identify the person who captured the visual and/or audio data, the reference data can include biometric information on the user, such as a user's fingerprint provided by the fingerprint detector 30. Date and time information regarding visual and/or audio data is captured by a clock function integrated into the device. Preferably, a precise time provided by the network operator or a manipulation secure time similar to NITZ, will be used to provide the reference data representing the date and time of capture of the visual and/or audio data.

Figure 4:
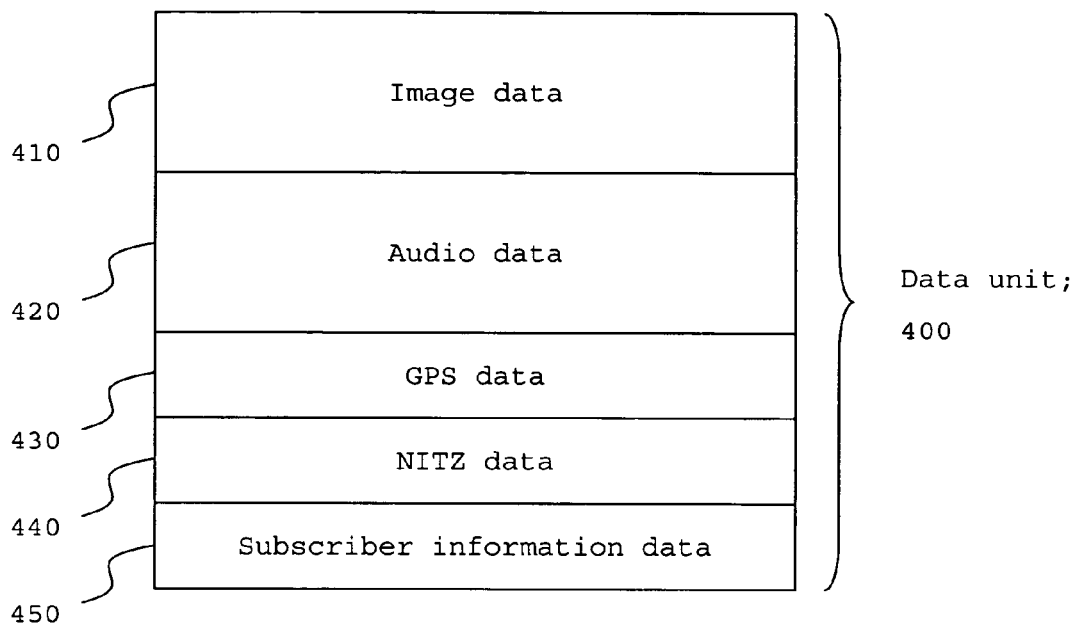
FIG. 4 illustrates a block diagram of a data unit consisting of captured data and corresponding reference data.

Turning now to FIG. 4, illustrated is a block diagram of a data unit made up of captured data and corresponding reference data. The software for controlling the mobile communications device 1 is adapted to provide at least one digital data unit 400 made up of the captured visual and/or audio data together with any applicable reference data. In FIG. 4 the digital data unit 400 is made up of digital image data 410 captured by a camera module 20; digital audio data 420 captured by a microphone 60; GPS data 430 provided by GPS receiver 42; NITZ data 440 taken from a NITZ message received from the network operator via the cellular network 300; and subscriber information data 450 identifying the owner of the mobile communications device 1. Other digital data information can also be included in a digital data unit 400, such as information gathered from infrared or radar sensors and still be within the scope of the intended invention.

Turning again to FIG. 2, for generating authentication data that allows confirmation of the source and/or integrity of the digital data unit 400, the mobile communications device 1 is provided with an encryption module 65 to perform cryptographic transformations of digital data. For encryption a private key 80 of an asymmetric key pair is stored in non-volatile device memory 75 and secured against user access. The key pair can be issued, for example, by the manufacturer of the mobile communications device 1. Also stored in the device memory 75 is a device certificate 85, which includes the public key of the asymmetric key pair as well as information unequivocally, identifying the mobile communications device 1, which certificate 85 may also be issued by the manufacturer.

Referring again to FIGS. 3a and 3b, subsequent authentication of a digital data unit 400 can also be made by way of a digital signature 550. To prevent any manipulation of the captured or reference data, a digital signature 550 is secured immediately after the capture of the image and/or audio data 410, 420 and its combination with the reference data 430, 440, 450 into the digital data unit 400.

The digital data unit 400 will typically consist of a large amount of data although it could, for example, only consist of a single digital image having a resolution of one megapixel together with reference data (assuming a color depth of one byte per pixel the digital data unit will have a data length of at least one Mbyte). Even if this data length is reduced by compression (which is also within the intended scope of the present invention), the digital data unit 400 will still have a considerable size. In such case a resulting digital signature will be essentially the same size as the digital data unit itself.

Accordingly, one embodiment of the present invention provides for a hash function 510, stored in the encryption module 65, which is executed on the digital data unit 400 to yield a hash value 520. This hash value 520 is then digitally signed using the signing function 530 in combination with the private key 80, which results in a digital signature 550. For the purpose of later authentication, this digital signature 550 can now be stored or passed along to a third party together with a copy 400' of the digital data unit 400.

FIG. 3b illustrates the process of proving the authenticity of a digital data unit 400" by utilizing the digital signature 550 and, thereby, establishing whether or not the digital data unit 400" is an identical copy of the original. The inverse signing function 540 in combination with the public key 90 can be used to convert the digital signature 550 back to hash value 520' that is identical with hash value 520. A second hash value 520" is generated by executing the known hash function 510 on the digital data unit 400". If a comparison 580 results in hash value 520' matching hash value 520", the authenticity of digital data unit 400" is proven 590. Thereby it can be established that the captured data and the corresponding reference data within the digital data unit 400" have not been altered since the digital signature 550 was generated. Thus the source and/or integrity of the digital data unit 400" is also established.

Although not shown, it is desirable that the certificate 90 stored in the mobile communications device memory 75 be passed along together with the digital data unit 400' and the digital signature 550 so that a certified public key can be used in the authentication process.

For proving the date and time when the visual and/or audio data was captured a timestamp can also be utilized, which timestamp can be provided by a separate trusted entity. For example, the digital data unit, the digital signature of the digital data unit or the digital signature of a hash value of the digital data unit can all be time-stamped by such entity. Time-stamping of a digital data unit can, for example, consist of appending date and time information to the digital data unit and encrypting the resulting data unit with a private key of an asymmetric key pair that belongs to the trusted entity by which the time-stamping is performed.

Figure 5:
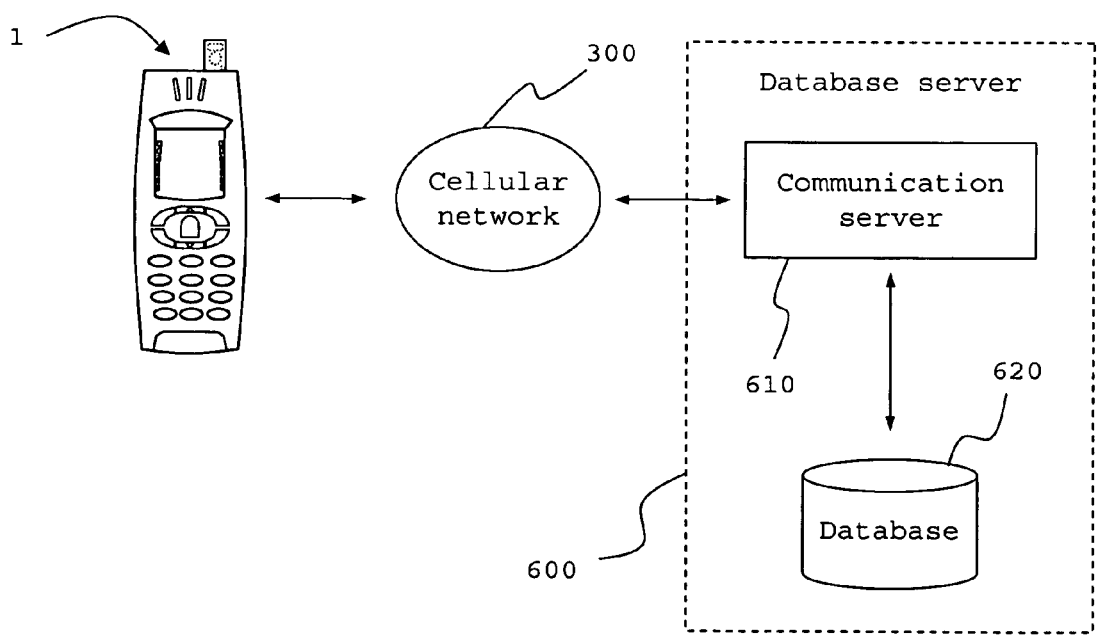
FIG. 5 illustrates an embodiment of the invention for the storage of a digital data unit and digital signature in a server.

FIG. 5 illustrates a flow chart of an embodiment of the invention for the storage of a digital data unit and digital signature in a server. Because it not always practical to permanently store captured data and the associated digital signatures in a mobile communications device 1 due to its limited memory capacity, one embodiment of the invention provides for the digital data unit 400' and the digital signature 550 to be transferred to a database server 600 via the cellular network 300. The database server 600 can be provided by the network operator or any other appropriate custodian. The illustrated embodiment shows a database server 600 that has a communications server 610 connected to a separate database 620 with sufficient storage capacity for long-time storage of data captured by a plurality of users.

Figure 6:
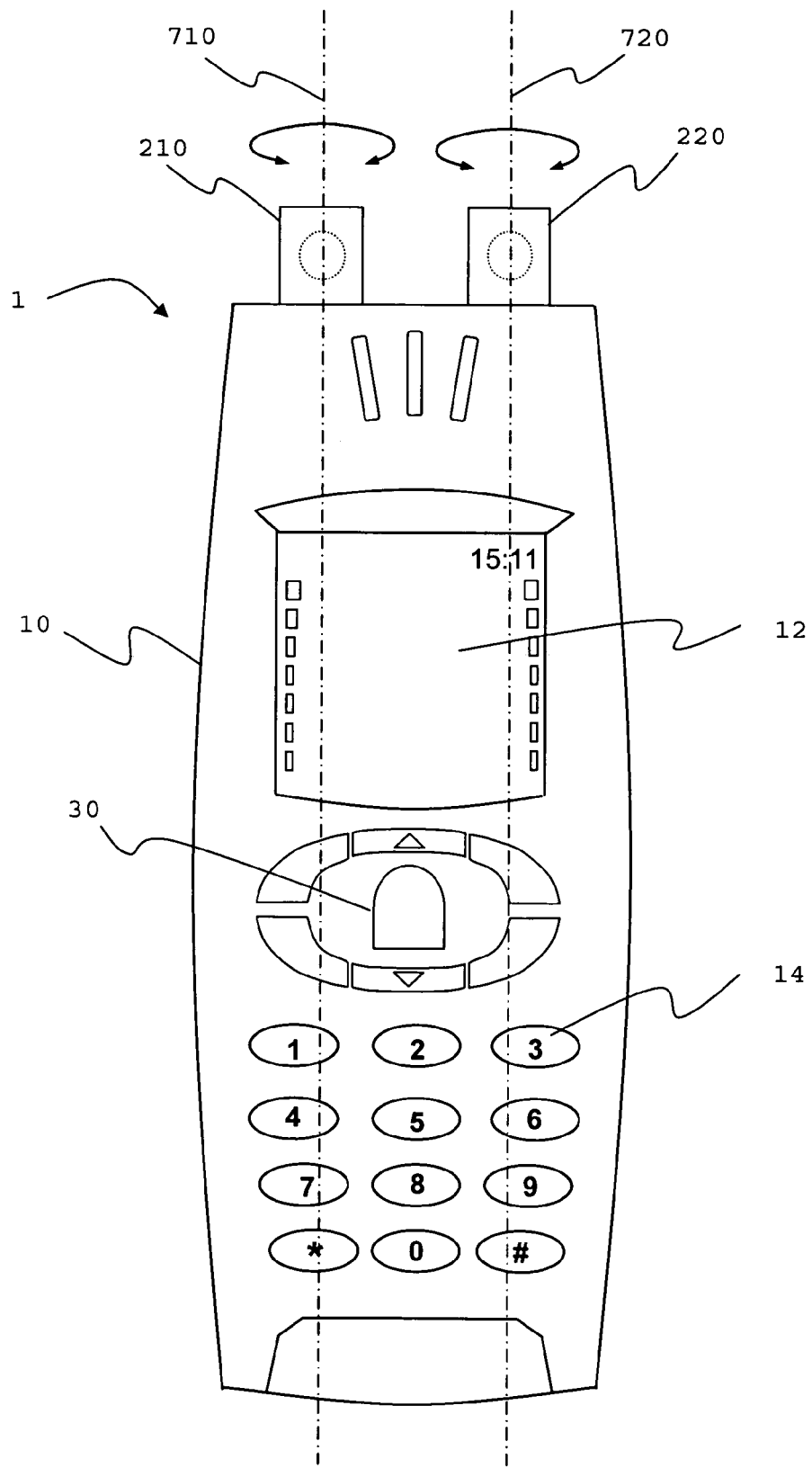
FIG. 6 illustrates a plan frontal view of an embodiment of a mobile communications device constructed in accordance with the present invention that has two camera modules.

Turning now to FIG. 6, illustrated is a plan front view of an embodiment of a mobile communications device constructed in accordance with the present invention that has two camera modules 210, 220. Shown is a first camera module 210 and a second camera module 220, each of which camera modules 210, 220 are rotatable (in one embodiment they are automatically rotatable) about the respective rotation axes 710 and 720. These two camera modules 210, 220 permit two digital images of the same scene to be simultaneously captured from different viewpoints from which a stereoscopic image can be generated. This permits data to be generated representing the position or distance of an object within a visually captured scene relative to the mobile communications device 1 or relative to another object within the scene. This data can also be incorporated as reference data into the digital data unit 400. The information regarding relative positions of objects in a visually captured scene can be especially advantageous when collecting evidence of a road accident or at a crime scene.

Although the present invention has been described in detail, those skilled in the art should understand that they can make various changes, substitutions and alterations herein without departing from the spirit and scope of the invention in its broadest form.

What is claimed is:

1. A method for authenticating a unit of digital data of a mobile communications device, comprising;
    capturing said unit of digital data with a mobile communications device;
    generating authentication data to confirm at least one of the source or integrity of said unit of digital data;
    capturing biometric data identifying a person who captured said unit of digital data;
    appending said biometric data to said unit of digital data to provide reference data corresponding to said unit of digital data, wherein said reference data further includes data selected from the group consisting of:
        data representing the date and time said unit of digital data was captured;
        data representing the location said unit of digital data was captured;
        data identifying the owner of said mobile communications device;
        data identifying said mobile communications device;
        data identifying a network operator of a mobile communications network to which said mobile communications device is connectable; and
        data representing the position or distance of an object within a visually captured scene relative to the mobile communications device or relative to another object within said visually captured scene; and
    capturing at least two images of a visually captured scene from different viewpoints and determining information about the position or distance of at least one object within said scene relative to said mobile communications device or relative to another object within said scene and including said information in said reference data.

2. The method as recited in claim 1 wherein said unit of digital data at least partly comprises said reference data.

3. The method as recited in claim 1 wherein said generating authentication data comprises generating a unique identifier with respect to said unit of digital data by means of a pre-defined algorithm.

4. The method as recited in claim 1 wherein said generating authentication data comprises generating a unique identifier with respect to said reference data by means of a pre-defined algorithm.

5. The method as recited in claim 1 wherein said generating authentication data further comprises generating a hash value resulting from a hash function executed on said unit of digital data.

6. The method as recited in claim 5 wherein generating authentication data includes generating a digital signature from the hash value by means of an asymmetric cryptographic algorithm using a private key of an asymmetric key pair.

7. The method as recited in claim 1 wherein generating said authentication data includes cryptographically transforming or digitally signing said unit of digital data by means of a cryptographic algorithm.

8. The method as recited in claim 7 wherein digitally signing includes generating a digital signature from said unit of digital data by means of an asymmetric cryptographic algorithm using a private key of an asymmetric key pair.

9. The method as recited in claim 1 wherein said reference data further includes data representing the date and time the digital data unit was captured, said date and time being based on a time base provided by a network operator.

10. The method as recited in claim 9 wherein said time base is NITZ (Network Identity and Timezone) according to 3GPP TS 22.042 V6.0.0.

11. The method as recited in claim 1 wherein said mobile communications device is connectable to a cell-based mobile communications network and said reference data includes information about neighboring cells of said mobile communications device at the time said unit of digital data was captured.

12. The method as recited in claim 1 wherein said mobile communications device is associated with a GPS receiver and said reference data includes information regarding the geographical location of said mobile communications device at the time said unit of digital data was captured, said information based on GPS data received by said mobile communications device plus a time reference.

13. The method as recited in claim 1 wherein said mobile communications device has an associated SIM card and said reference data includes data from said SIM card that unequivocally identifies the owner of said mobile communications device and/or the network provider of the mobile communications network to which said mobile communications device is connectable.

14. The method as recited in claim 1 wherein said capturing of said biometric data identifying a person who captured said unit of digital data includes capturing fingerprint data of the person who operated said mobile communications device while capturing said unit of digital data.

15. The method as recited in claim 1 wherein said reference data includes a certificate that unequivocally identifies said mobile communications device.

16. The method as recited in claim 1 wherein data is transmitted to a database server, said data transmitted selected from the group consisting of:
    a unit of digital data;
    reference data;
    a unique identifier generated on the basis of said unit of digital data and/or said reference data;
    a hash value generated by executing a hash function on said unit of digital data; and
    a digital signature generated from said unit of digital data by means of an asymmetric cryptographic algorithm using a private key of an asymmetric key pair.

17. The method as recited in claim 1 further comprising authenticating said unit of digital data by means of said authentication data.

18. A mobile communications device, comprising:
    a means for capturing a unit of digital data;
    a means for generating authentication data to confirm at least one of the source or integrity of said unit of digital data;
    a means for capturing biometric data identifying a person who captures said unit of digital data;
    a means for providing reference data appended to said unit of digital data, said reference data including said biometric data, and wherein said reference data further includes data selected from the group consisting of:
        data representing a date and time said unit of digital data was captured;
        data representing a location said unit of digital data was captured;
        data identifying an owner of said mobile communications device;

data identifying said mobile communications device;

data identifying a network operator of a mobile communications network to which said mobile communications device is connectable; and data representing the position or distance of an object within a visually captured scene relative to the mobile communications device or relative to another object within said visually captured scene; and a means for capturing at least two images of a visually captured scene from different viewpoints and determining information about the position or distance of at least one object within said scene relative to said mobile communications device or relative to another object within said scene and including said information in said reference data.

19. The mobile communications device as recited in claim 18 wherein said means for capturing a unit of digital data is selected from the group consisting of:

a camera module adapted to capture digital images;

a camera module adapted to capture digital video sequences; and an audio recording module adapted to capture digital audio sequences.

20. The mobile communications device as recited in claim 18 wherein said means for capturing a unit of digital data includes a first camera module and a second camera module arranged to respectively capture a first digital image and a second digital image, said first digital image having a viewpoint that differs from said second digital image.

21. The mobile communications device as recited in claim 18 further comprising a means for generating a unique identifier from said unit of digital data and/or from said reference data with a pre-defined algorithm stored in a memory of said mobile communications device.

22. The mobile communications device as recited in claim 18 further comprising an encryption means for cryptographically transforming said unit of digital data adapted to at least one selected from the group consisting of:

generating a hash value by executing a pre-defined hash function on said unit of digital data;

generating a digital signature from said unit of digital data by means of an asymmetric cryptographic algorithm using a private key of an asymmetric key pair; and generating a digital signature from a hash value by means of an asymmetric cryptographic algorithm using a private key of an asymmetric key pair.

23. The mobile communications device as recited in claim 18 further comprising a means for providing the current date and time.

24. The mobile communications device as recited in claim 18 wherein mobile communications device is adapted to receive and utilize NITZ messages (Network Identity and Timezone) according to 3GPP TS 22.042 V6.0.0 sent by a network provider.

25. The mobile communications device as recited in claim 18 further comprising a means for determining cell information of a cellular network.

26. The mobile communications device as recited in claim 18 further comprising a GPS (Global Positioning System) receiver for determining a geographical position of said mobile communications device.

27. The mobile communications device as recited in claim 18 further comprising a SIM card with information stored thereon identifying the owner of said mobile communications device and/or a network provider for said mobile communications device.

28. The mobile communications device as recited in claim 18 wherein said means for capturing biometric data identifying a person who captures said unit of digital data further comprises a fingerprint detector integrated in a shutter release means of a camera module associated with said mobile communications device.

29. The mobile communications device as recited in claim 18 further comprising a means for providing a digital certificate that unequivocally identifies said mobile communications device.

30. The mobile communications device as recited in claim 29 wherein said digital certificate is issued by a manufacturer of said mobile communications device.

31. The mobile communications device as recited in claim 29 wherein said digital certificate includes a public key of an asymmetric key pair.

32. A communications system, comprising:

a communications network connectable to a mobile communications device and a database server;

said mobile communications device including:

a means for capturing a unit of digital data;

a means for generating authentication data to confirm at least one of the source or integrity of said unit of digital data;

a means for capturing biometric data identifying a person who captures said unit of digital data; and a means for providing reference data appended to said unit of digital data, said reference data including said biometric data and wherein said reference data further includes data selected from the group consisting of:

data representing a date and time said unit of digital data was captured;

data representing a location said unit of digital data was captured;

data identifying an owner of said mobile communications device;

data identifying said mobile communications device;

data identifying a network operator of a mobile communications network to which said mobile communications device is connectable; and data representing the position or distance of an object within a visually captured scene relative to the mobile communications device or relative to another object within said visually captured scene; and said database server including a means for receiving and storing data regarding an item selected from the group consisting of:

said unit of digital data including visual and/or audio data captured by means of said mobile communications device, said unit of digital data having optionally appended thereto said reference data corresponding to said visual and/or audio data;

said reference data corresponding to said visual and/or audio data;

a unique identifier generated on the basis of said unit of digital data and/or said reference data;

a hash value generated by executing a hash function on said unit of digital data; and a digital signature generated by said unit of digital data by means of an asymmetric cryptographic algorithm using a private key of an asymmetric key pair.

* * * * *